Figure 1:
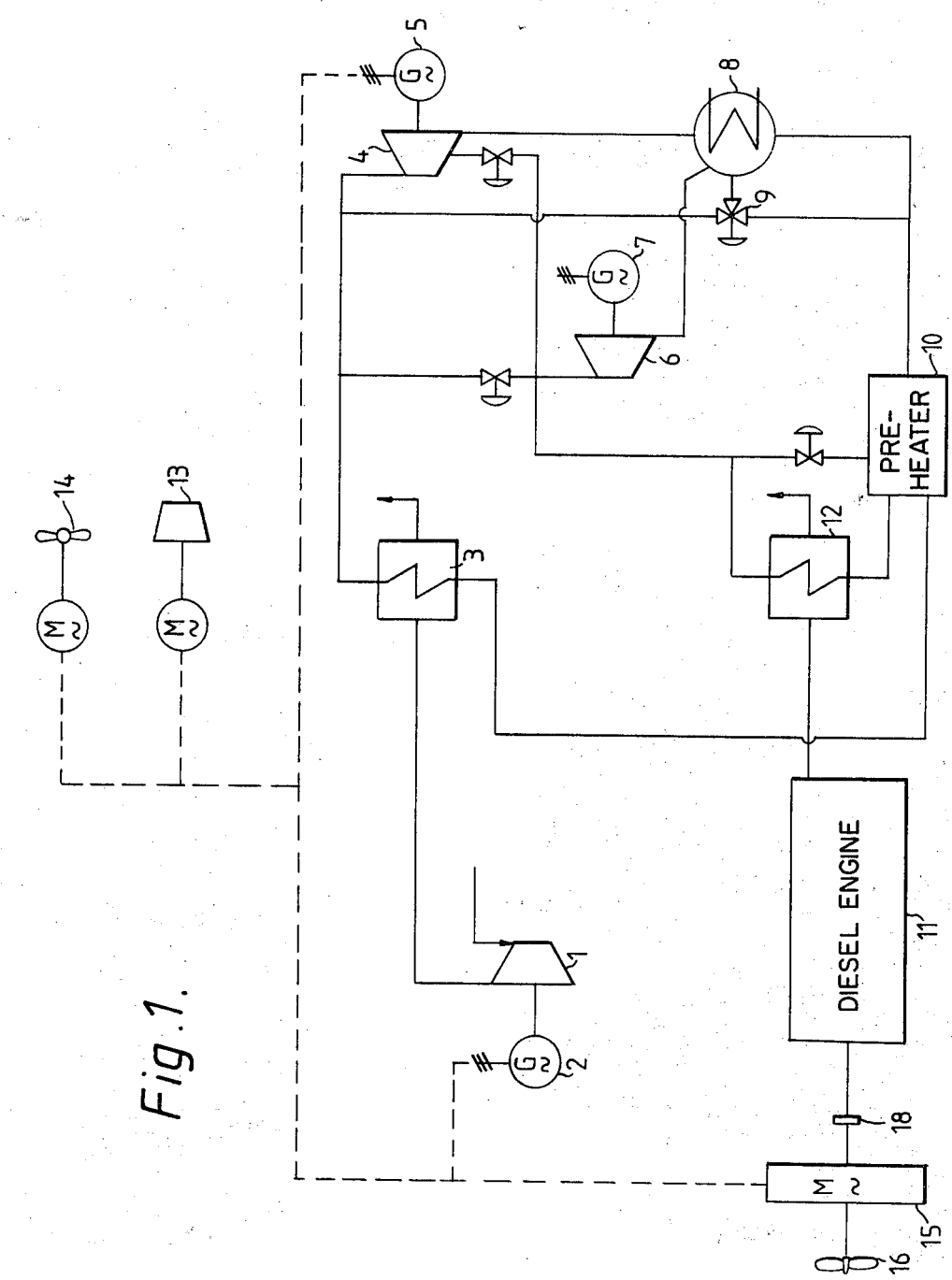

United States Patent [19]

Koren

[11] 4,417,878
[45] Nov. 29, 1983

[54] PROPULSION MACHINERY FOR LNG SHIPS

[75] Inventor: Stein Koren, Moss, Norway

[73] Assignee: Moss Rosenberg Verft A/S, Moss, Norway

[21] Appl. No.: 247,275

[22] Filed: Mar. 25, 1981

[30] Foreign Application Priority Data

Mar. 31, 1980 [NO] Norway ............................. 800935

[51] Int. Cl.³ ........................................... B63H 21/20
[52] U.S. Cl. .................................... 440/3; 114/74 R; 60/39.182
[58] Field of Search ..................... 440/3, 4; 114/74 A, 114/74 R; 62/52; 60/618, 716, 698, 39.182

[56] References Cited

U.S. PATENT DOCUMENTS

| 1,095,461 | 5/1914 | Emmet | 440/3 |
| 3,183,666 | 5/1965 | Jackson | 62/52 |
| 3,726,085 | 4/1973 | Arenson | 62/52 |
| 4,114,555 | 9/1978 | O'Brien | 440/4 |

FOREIGN PATENT DOCUMENTS

| 2109501 | 9/1972 | Fed. Rep. of Germany | 114/74 A |
| 754215 | 11/1933 | France | 440/3 |
| 602573 | 5/1948 | United Kingdom | 440/3 |
| 2002057 | 2/1979 | United Kingdom | 62/52 |

Primary Examiner—Trygve M. Blix
Assistant Examiner—Thomas J. Brahan
Attorney, Agent, or Firm—Pasquale A. Razzano

[57] ABSTRACT

Machinery arrangement for LNG ships consisting of a diesel engine and a combined gas turbine-steam turbine-electrical system. The diesel engine and the electromotor drive a vp-propeller. The diesel engine burns only bunker oil, while the combined gas turbine-steam turbine plant burns boiled off gas from the cargo.

5 Claims, 2 Drawing Figures

PROPULSION MACHINERY FOR LNG SHIPS

The invention relates to LNG ships, or more specifically to propulsion machinery for such ships, said machinery being based on combustion of bunker oil and boiled off gas from the cargo.

In the transportation of LNG on board ship, for example on an LNG ship based on the known Moss-Rosenberg concept with self-supporting, insulated spherical tanks, evaporation of the natural gas represents a costly loss, even though it does not amount to more than a few percent of the total cargo. The gas which is boiled off can in principle be handled in the following ways:

Venting to the atmosphere
Burning it off (i.e. combustion in the atmosphere)
Combustion (utilization) in the propulsion machinery
Total ("zero-loss") condensation
Partial condensation combined with partial combustion and utilization in the propulsion machinery.

Of these possibilities, boiled off combustion in the propulsion machinery is the simplest and most economical method, and several different systems are known for utilizing the boiled off gas in propulsion machinery (bi-fuel diesel engines, bi-fuel steam turbine plants and bi-fuel gas turbine plants).

The energy content of boiled off gas as fuel constitutes one-half or less of the energy needed to drive a larger LNG ship (about 130.000 m$^3$) at 18–19 knots. Therefore, bi-fuel solutions have formed the basis for the systems used heretofore, i.e. possibly using diesel engines intended to run on oil and boiled off gas, or turbine plants in which both types of fuel are used together.

A bi-fuel diesel engine can be driven with the same efficiency as an ordinary diesel engine, but additional equipment is required. If the bi-fuel engine is coupled directly to the propeller shaft, it cannot be utilized for removing boiled off gas when the ship is in harbour or if the engine suffers a breakdown. A bi-fuel engine therefore requires, e.g., a burn-off device (flare) as auxiliary equipment in addition to the other extra equipment necessary for the engine itself.

Combustion of the boiled off gas in the combustion chamber of a gas turbine is a simple and problem-free process. Natural gas is an ideal gas turbine fuel. A gas turbine-electrical plant is simple and reliable. When the LNG ship is in harbour, one cannot combust the boiled-off in the gas turbine without additional equipment. Thus, if one nevertheless wishes to get rid of the boiled off gas via the gas turbine, the electrical energy which is not consumed by the ship's network, by auxiliary equipment and by a condensation plant for the gas, if present, must be removed in a water brake. Burning off the gas in a flare which is coupled in parallel with the gas turbine represents a simple solution to the problem.

The use of a steam turbine plant has the advantage that the boiler can be used for combusting the boiled off gas at all times. A drawback is that the boiler must be kept in operation even when the ship is in harbour, because a separate condenser is required. Another drawback is a relatively high specific fuel consumption.

It is also possible to utilize a combined gas and steam turbine plant which combusts oil and boiled off gas. In such a combined turbine plant, the steam turbines are driven by steam from an exhaust boiler connected to the gas turbine. When the ship is in harbour, one can for instance lock the rotor on the gas turbine and permit the combustion product to vent to the atmosphere and/or to the exhaust boiler. The same is true if, for example, the gas turbine should become non-operational, in that one can then lock the rotor and let the hot gases go to the boiler so that one obtains full steam production for the steam turbine.

There are certain problems associated with the use of poorer-quality bunker oils in gas turbines, and as already mentioned, a bi-fuel diesel engine also has certain restrictions. Ideally, one would like to be able to burn bunker oil of poor quality, and to reduce the amount at the same time, as mentioned above, it would be desirable to be able to utilize the boiled off gas under all conditions (including loading and ballast voyages, and while in harbour) without having to resort to a recondensation plant, which is expensive and energy consuming and consequently not justifiable in a situation in which the value of bunker oil and LNG do not differ greatly. The object of the present invention is to provide a system of propulsion machinery for LNG ships whereby the above desired conditions are satisfied. This aim is achieved according to the invention in that the propulsion machinery is composed of one or more diesel engines which burn bunker oil, and a combined gas turbine-steam turbine-electrical plant (GS-plant) which burns the boiled off gas.

In other words, the invention combines diesel engines and a GS plant, wherein the power from the latter is transferred electrically in a known manner. Both the GS plant and the diesel engine, independently, represent power-generating machines with optimum efficiencies. The advantages one obtains with the new arrangement according to the invention are:

A savings in bunker fuel (about 20 tons per 24 hours for a 130.000 m$^3$ LNG ship) is obtained, as compared to the fuel consumption of the machinery predominant today, the steam turbine plant (and the latter of fuel is concerned). In the case of new ships, one could also reap further rewards by optimizing the hull shape/propulsion relationship.

The boiled off gas can be combusted under all conditions in the GS plant, which is dimensioned with a certain overcapacity in order to be able to accomodate forced boiled off gas, for instance in connection with cooling of the tanks. In harbour, the working rotor of the gas turbine is locked and the energy generated from the heating of the boiled off gas is led to the funnel, optionally via the steam boiler. Generated excess steam is dumped. Gas turbines are particularly well suited for combusting boiled off gas having a high nitrogen content, which is relatively often the case.

The GS plant, in principle, combusts only gas, and one thereby avoids problems with liquid fuels of varying qualities. Electrical transfer enables one to place the GS plant wherever desired. An advantageous location is in the vicinity of the funnel, thereby reducing-/eliminating problems connected with leading gas into the engine room.

The diesel engine can be constructed for maximum efficiency without having to resort to the compromises that are necessary in the case of a bi-fuel (oil-gas) engine.

The exhaust gas from the diesel engine can contain sufficient energy to drive an electric generator for the ship's normal needs at sea. In harbour, and otherwise as needed, all steam or required excess steam can be taken from the GS plant. The new arrangement is admirably suited for automatic regulation of the balance of power between the GS system and the diesel, depending on the available amount of boiled off gas and the total power output desired.

Large but sporadic power consumers, such as the side screw and "high duty" compressors (for gas return during loading/cooling) can be driven electrically from the same network that transfers the power from the GS plant to the propeller shaft.

If the GS plant is not in operation, power is provided from the electromotor, which without being modified can run as a generator. This is made possible through the use of variable-pitch propellers, which in addition enable one to obtain optimum drive at varying power and therefore represent the most advantageous solution. Alternately, a coupling can be arranged between the propeller and this electrical motor/generator.

When maximum propulsion power is required, the above-mentioned sporadic consumers will not draw power, and one thus avoids the necessity of installing auxiliary machine power in order to accomodate such heavy consumption. It is of course also possible to drive gas compressors, for example, with steam from the GS plant.

The transmission network for the GS propeller shaft is preferably designed for, e.g., 6 kV, thus minimizing the cable area. By using a vp-propeller, the frequency can be held constant; however, regulation of the rpm rate can be obtained, if desired, by varying the frequency, which is permissible since the network is a limited one.

In case of a diesel engine malfunction, or if one wishes to run the ship on boiled off gas alone, the diesel engine may be disengaged. Further possibilities for stand-by propulsion can be arranged by providing the steam boiler in the GS plant with additional fueling. In this way, sufficient "take-home" power is provided in the event that both the gas turbine and the diesel engine should fail. One might also equip the gas turbine for combusting distillate (diesel oil), which is available on board for the diesel system, etc. In this way it will be possible to increase the cruising speed when there is no gas on board.

Presumably, it would be proper to select the output of the diesel engine such that it together with the GS plant has sufficient power (with normal reserves built in) for the selected cruising speed. In cases when there is no longer gas in the tanks and thus no boiled off gas available for utilization, a somewhat lower cruising speed is accepted. There is of course nothing to prevent one from selecting a larger diesel engine, but the diesel would then have to run with reduced power (and poorer efficiency) when boiled off gas is being combusted. It is in this case possible to install two diesel engines which are geared on a common propeller shaft together with the electro-motor. The latter can then be a fast-running and consequently cheaper version. During boil-off operation, one diesel engine can be disengaged, which means that the one which is running will operate at or near its optimum operational rating as regards specific bunker oil consumption. One might also employ a dual-propeller solution and divide the output power (diesel-electric) of the propulsion machinery between the two. This solution could apply for both alternatives, that is, for diesel engines of high or moderate power.

Figure 2:
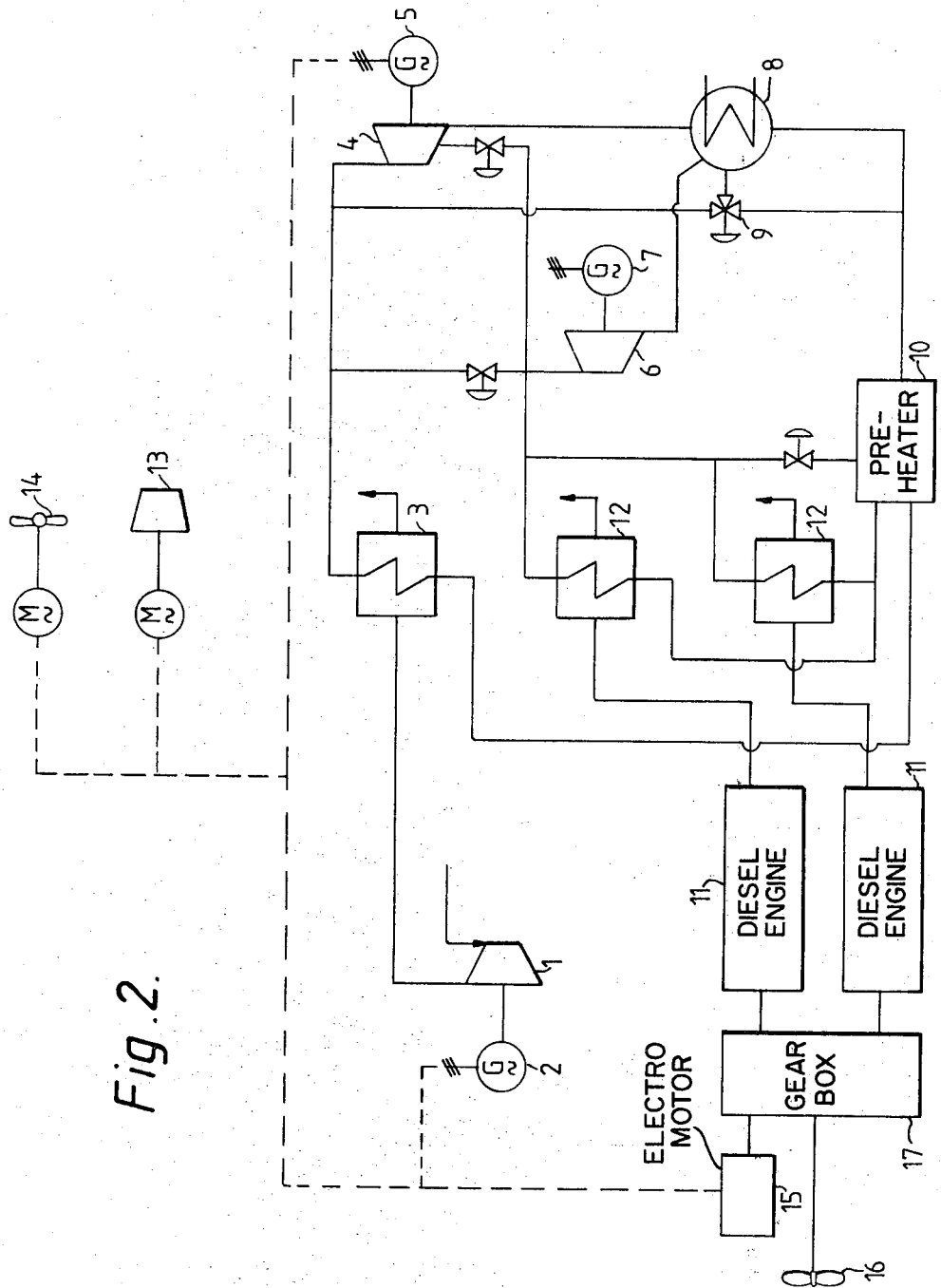

In the accompanying drawings,

FIG. 1 shows a flow diagram for a system having one diesel engine and a combined gas-steam turbine plant, and FIG. 2 shows a flow diagram for a corresponding propulsion machinery system having two diesel engines.

On the two flow diagrams, FIGS. 1 and 2, the same reference numbers are used for like components of the propulsion machinery.

The propeller 16 is a vp-propeller (variable-pitch). A direct-drive electromotor 15 drives the vp-propeller directly. Between the electromotor 15 and a diesel engine 11 is a coupling 18 which is disengageable when the diesel engine is not running. The diesel engine 11 runs on heavy oil (residual oil). The electromotor 15 obtains its power from a combined gas turbine-steam turbine plant (GS plant), fueled by boiled off gas, which is preferably positioned high up in the engine room. The gas turbine is designated by the number 1 and its generator by 2. The gas turbine 1 is connected to an exhaust boiler 3 which delivers steam to a steam turbine 4, whose generator is designated by the number 5.

Recoverable energy in the exhaust gas from the diesel engine can in this case be utilized in a steam turbine-driven generator, which supplies the ship's normal electrical network. The exhaust gas from the diesel engine goes to an exhaust boiler 12 which delivers steam to a steam turbine 6, whose generator 7 delivers electric power to the normal ship network. The steam turbine 6 can naturally also be driven from the exhaust boiler 3, and as the flow diagrams show, the steam turbine 4 is also coupled to the same steam network. A condenser is designated by number 8, and a pressure-reducing valve with water injection by the number 9. A pre-heater is identified by the number 10.

A transverse propeller is designated 14, and a compressor for gas is designated 13. These sporadic consumers, as shown in the diagrams, are driven electrically from the same network that transfers the power from the GS plant to the propeller shaft. The flow diagram in FIG. 2 has the same construction in principle as FIG. 1, the only difference being that two diesel engines drive the vp-propeller 16 via a gear box 17. The electromotor 15, which obtains electrical power from the generators 2 and 5, is connected to the gear box 17. In contrast to FIG. 1, where it is a condition that a long-stroke, low-speed diesel engine be used, the two diesel engines in the arrangement of FIG. 2 are high-speed and consequently cheaper versions. One of these diesel engines can be disengaged when the machinery is utilizing boil-off gas (from the GS plant), and the remaining diesel engine that is running will then operate at or near its optimum operational rating as regards specific bunker oil consumption.

The invention provides a flexible system of propulsion machinery, wherein one part of the propulsion machinery (the GS plant) is intended only for combusting boiled off gas from the cargo, while the second part (the diesel engine) only burns heavy oil. One thus obtains the desirable advantages mentioned previously.

Having described my invention, I claim:

1. A ship propulsion system for LNG tank ships using combustible bunker oil and boiled off cargo gas, said system including a propeller, an electromotor operatively engaged with said propeller for driving the propeller, at least one diesel engine operatively engaged with said propeller for selectively driving the propeller with said electromotor or independently thereof, and combined gas turbine-steam turbine electrical plant means operatively connected to said electromotor for driving said propeller; said combined gas turbine-steam turbine-electrical plant fueled by boiled off gas, includes exhaust boiler means for receiving and utilizing exhaust gas from the diesel engine for the production of steam used in the turbine.

2. A ship propulsion system as defined in claim 1 wherein said electromotor is connected directly to said propeller for direct drive thereof.

3. A ship propulsion system as defined in claim 2 including selectively disengageable coupling means for operatively connecting said at least one diesel engine directly to said electromotor.

4. A ship propulsion system as defined in claim 1 including a gear box drivingly connected to said propeller said electromotor and said at least one diesel engine each being directly connected to said gear box.

5. A ship propulsion system as defined in claim 4 wherein said propeller is a variable pitch propeller.

* * * * *